US010643607B2

(12) United States Patent
Meshram (10) Patent No.: US 10,643,607 B2
(45) Date of Patent: May 5, 2020

(54) VOCAL TRIGGERING OF PRESENTATION TRANSITIONS

(71) Applicant: DISH Network L.L.C., Englewood, CO (US)

(72) Inventor: Shruti Meshram, Denver, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days.

(21) Appl. No.: 16/146,270

(22) Filed: Sep. 28, 2018

(65) Prior Publication Data

US 2020/0105251 A1 Apr. 2, 2020

(51) Int. Cl.
 *G10L 15/08* (2006.01)
 *G10L 15/22* (2006.01)
 *G10L 15/05* (2013.01)
 *G06F 16/33* (2019.01)

(52) U.S. Cl.
 CPC ........ *G10L 15/083* (2013.01); *G06F 16/3331* (2019.01); *G10L 15/05* (2013.01); *G10L 15/22* (2013.01); *G10L 2015/088* (2013.01); *G10L 2015/223* (2013.01)

(58) Field of Classification Search
 CPC ....... G10L 15/083; G10L 15/05; G10L 15/22; G06F 16/3331
 See application file for complete search history.

(56) References Cited

U.S. PATENT DOCUMENTS

| | | | | |
|---|---|---|---|---|
| 9,026,915 B1 * | 5/2015 | Ehlen | ...................... | G06F 16/70 715/728 |
| 10,127,224 B2 * | 11/2018 | Deleeuw | ............. | G06F 17/2785 |
| 10,242,672 B2 * | 3/2019 | Vangala | ................... | G10L 15/22 |
| 2005/0038660 A1 | 2/2005 | Black et al. | | |
| 2016/0202949 A1 * | 7/2016 | Wang | ...................... | G06F 3/167 367/197 |
| 2018/0059796 A1 | 3/2018 | Carr et al. | | |
| 2018/0174600 A1 * | 6/2018 | Chaudhuri | ......... | G06K 9/00288 |
| 2018/0308324 A1 * | 10/2018 | Mixter | .................... | G06F 3/167 |
| 2019/0129592 A1 * | 5/2019 | Anders | ............... | G06F 17/2785 |

FOREIGN PATENT DOCUMENTS

JP 2006 208696 A 8/2006

OTHER PUBLICATIONS

International Search Report and Written Opinion for PCT/US2019/048243 dated Nov. 11, 2019, all pages.

* cited by examiner

*Primary Examiner* — Mohammad K Islam
(74) *Attorney, Agent, or Firm* — Kilpatrick Townsend & Stockton LLP (57) ABSTRACT

Various arrangements for triggering transitions within a slide-based presentation are presented. An audio-based trigger system may receive a plurality of trigger words. A database may be created that maps trigger words to slide transitions. A voice-based request may be received to initiate audio control of the slide-based presentation being output by the presentation system. An audio stream may be monitored for trigger words. Based on accessing a database, a slide transition to be performed may be identified based on a recognized trigger word. A slide transition request may be transmitted to a presentation system that indicates a slide to which a transition should occur. The presentation system may then transition to the slide based on the received slide transition request.

17 Claims, 5 Drawing Sheets

| Presentation Identifier: 5G Network Improvements | | | | | | |
|---|---|---|---|---|---|---|
| Trigger Phrase | Transition Type | Transition Destination | Authorized User | Synonyms Active? | Synonym Score | Audio Sample |
| "5G Network Architecture" | Absolute | Slide 2 | Presenter | No | | Yes |
| "Next part of the network" | Relative | Next slide (+1) | Presenter | Yes | 92 | Yes |
| "Jump back" | Relative | Back 2 slides (-2) | Presenter | Yes | 85 | Yes |
| "Low-Latency Communications" | Absolute | From Slide 2 to Slide 3 | Presenter | No | | Yes |
| "Architecture Transformation" | Absolute | From Slide 3 to Slide 4 | Presenter | No | | Yes |
| "Contact Information" | Absolute | Slide 1 | All | Yes | 90 | No |

VOCAL TRIGGERING OF PRESENTATION TRANSITIONS

BACKGROUND

In many situations, an efficient way to give a presentation or talk is to use electronically-presented slides. A presenter may typically press a button or use a handheld remote control to trigger transitions between slides. Sometimes, a presenter may recruit another person as an assistant to trigger the transition between slides based on the presenter's instructions. Such arrangements may not be ideal: an assistant may make mistakes while transitioning through slides by transitioning too early or too late; a remote control may be cumbersome and relies on a presenter remembering to press the appropriate button.

SUMMARY

Various embodiments are described related to a system that triggers transitions within a slide-based presentation. In some embodiments, a system that triggers transitions within a slide-based presentation is described. The system may include a home assistant device in communication with a cloud-based server system. The system may include a microphone that serves as a primary user input interface. The system may include a speaker. The system may include a wireless network interface through which the home assistant device communicates with the cloud-based server system. The system may include one or more processors in communication with the microphone, the speaker, and the wireless network interface. The one or more processors may be configured to receive a plurality of trigger words. Each trigger word of the plurality of trigger words may be linked to a slide transition definition of a plurality of slide transition definitions. Each slide transition definition of the plurality of slide transition definitions may define a selection of a slide of the plurality of slides for presentation. The one or more processors may be configured to create a database that maps the plurality of trigger words to the plurality of slide transition definitions. The one or more processors may be configured to receive a voice-based request, via the microphone, to initiate audio control of the slide-based presentation being output by a presentation system. The one or more processors may be configured to monitor an audio stream received via the microphone for the plurality of trigger words. The one or more processors may identify a trigger word of the plurality of trigger words within the monitored audio stream. The one or more processors may determine, based on accessing the database, a slide transition to be performed based on the trigger word. The one or more processors may transmit, to the presentation system, a slide transition request that indicates the slide based on the determined slide transition.

Embodiments of such a system may include one or more of the following features: The system may further include the presentation system. The presentation system may include a display system for presenting slides. The presentation system may include one or more processors. The one or more processors may be configured to receive the slide transition request. The one or more processors may cause the presentation to transition to the slide of the plurality of slides based on the received slide transition. The one or more processors of the home assistant device being configured to monitor the audio stream for the plurality of trigger words may include the one or more processors being configured to transmit the audio stream to the cloud-based server system via the Internet. The one or more processors may be configured to perform a voice recognition process on the received audio stream. The one or more processors of the home assistant device in communication with the cloud-based server system may be further configured to receive the plurality of slide transition definitions. A first subset of the plurality of slide transition definitions may define slide transitions to a next consecutive slide. A second subset of the plurality of slide transition definitions may define slide transitions to a specific slide. The one or more processors of the presentation system may be further configured to define the plurality of trigger words based on content of the plurality of slides. The home assistant device in communication with the cloud-based server system may be configured to perform a training process to distinguish a voice of a presenter from voices of an audience. The home assistant device in communication with the cloud-based server system that may be configured to monitor the audio stream for the plurality of trigger words may include monitoring only the voice of the presenter in the audio stream for the plurality of trigger words.

In some embodiments, a method for triggering transitions within a slide-based presentation is described. The method may include receiving, by an audio-based trigger system, a plurality of trigger words. Each trigger word of the plurality of trigger words may be linked to a slide transition definition of a plurality of slide transition definitions. Each slide transition definition of the plurality of slide transition definitions may define a selection of a slide of the plurality of slides for presentation. The method may include creating, by the audio-based trigger system, a database that may map the plurality of trigger words to the plurality of slide transition definitions. The method may include receiving, by the audio-based trigger system, a voice-based request to initiate audio control of the slide-based presentation being output by a presentation system. The method may include monitoring, by the audio-based trigger system, an audio stream for the plurality of trigger words. The method may include identifying, by the audio-based trigger system, a trigger word of the plurality of trigger words within the monitored audio stream. The method may include determining, based on accessing the database by the audio-based trigger system, a slide transition definition to be performed based on the trigger word. The method may include transmitting, by the audio-based trigger system, to the presentation system, a slide transition request that indicates the slide based on the determined slide transition definition. The method may include transitioning, by the presentation system, to the slide of the plurality of slides based on the received slide transition request.

Embodiments of such a method may include one or more of the following features: The audio-based trigger system may include a separate audio-listening device from the presentation system. The audio-based trigger system may be a home assistant device that comprises: a speaker; a microphone; and a wireless network interface. The audio-based trigger system may further include a cloud-based server system that may communicate with the home assistant device via the Internet. Monitoring, by the audio-based trigger system, the audio stream for the plurality of trigger words may include transmitting, by the audio-based trigger system, the audio stream to the cloud-based server system via the Internet. The method may include performing, by the cloud-based server system, a voice recognition process on the received audio stream. The method may further include receiving, by the audio-based trigger system, the plurality of slide transition definitions. A first subset of the plurality of slide transition definitions may define slide transitions to a next consecutive slide; and a second subset of the plurality of slide transition definitions defines slide transitions to a specific slide. The presentation system may define the plurality of trigger words based on content of the plurality of slides. The audio-based trigger system may be incorporated as part of the presentation system. The method may further include performing, by the audio-based trigger system, a training process to distinguish a voice of a presenter from voices of an audience. Monitoring, by the audio-based trigger system, the audio stream for the plurality of trigger words may include monitoring only the voice of the presenter in the audio stream for the plurality of trigger words.

In some embodiments, a non-transitory processor-readable medium is described. The medium may include processor-readable instructions configured to cause one or more processors to receive a plurality of trigger words. Each trigger word of the plurality of trigger words may be linked to a slide transition definition of a plurality of slide transition definitions. Each slide transition definition of the plurality of slide transition definitions may define a selection of a slide of the plurality of slides for presentation. The one or more processors may create a database that maps the plurality of trigger words to the plurality of slide transition definitions. The one or more processors may receive a voice-based request to initiate audio control of a slide-based presentation being output by a presentation system. The one or more processors may monitor an audio stream for the plurality of trigger words. The one or more processors may identify a trigger word of the plurality of trigger words within the monitored audio stream. The one or more processors may determine, based on accessing the database, a slide transition definition to be performed based on the trigger word. The one or more processors may transmit to the presentation system, a slide transition request that indicates the slide based on the determined slide transition definition.

Embodiments of such a medium may include one or more of the following features: The processor-readable instructions may be executed using a system comprising a home assistant device and a cloud-based server system that communicates with the home assistant device. The processor-readable instructions may be further configured to cause the one or more processors to cause the audio stream to be transmitted to the cloud-based server system via the Internet. The one or more processors may perform a voice recognition process on the received audio stream using the cloud-based server system. The processor-readable instructions may be further configured to cause the one or more processors to receive the plurality of slide transition definitions. A first subset of the plurality of slide transition definitions may define slide transitions to a next consecutive slide; and a second subset of the plurality of slide transition definitions may define slide transitions to a specific slide.

DETAILED DESCRIPTION

Vocal triggers can be defined by a presenter such that certain trigger words or trigger phrases spoken by the presenter trigger a transition to a next slide, a previous slide, or a specific slide within a presentation. Such an arrangement may allow a user to present a presentation without requiring any handheld equipment or help from a human assistant. An audio-based trigger system may have one or more microphones that listen to the presentation as spoken by the presenter. In response to the presenter saying a trigger word or trigger phrase, the audio-based trigger system causes a presentation system to transition to the slide that has been mapped to the trigger word or trigger phrase.

Such an arrangement can be performed using a home assistant device. A home assistant device is triggered to analyze audio based on a wake-up word or phrase initially being spoken. Audio captured after the wake-up word or phrase may be uploaded to a cloud-based server system for natural speech analysis via the Internet. The cloud-based system may analyze the speech to identify the presence of a trigger word or trigger phrase that has previously been linked with a slide transition. In response, a request for a slide transition may be transmitted to a presentation system that causes a transition to the requested slide (e.g., the next slide, the previous slide, a next slide, a specific slide).

The audio-based trigger system may be trained to distinguish the voice of the presenter from other voices, such as persons in an audience. By the presenter performing an initial training process, inadvertent transitions that are caused by a person in the audience speaking a trigger word or trigger phrase may be reduced.

Figure 1:
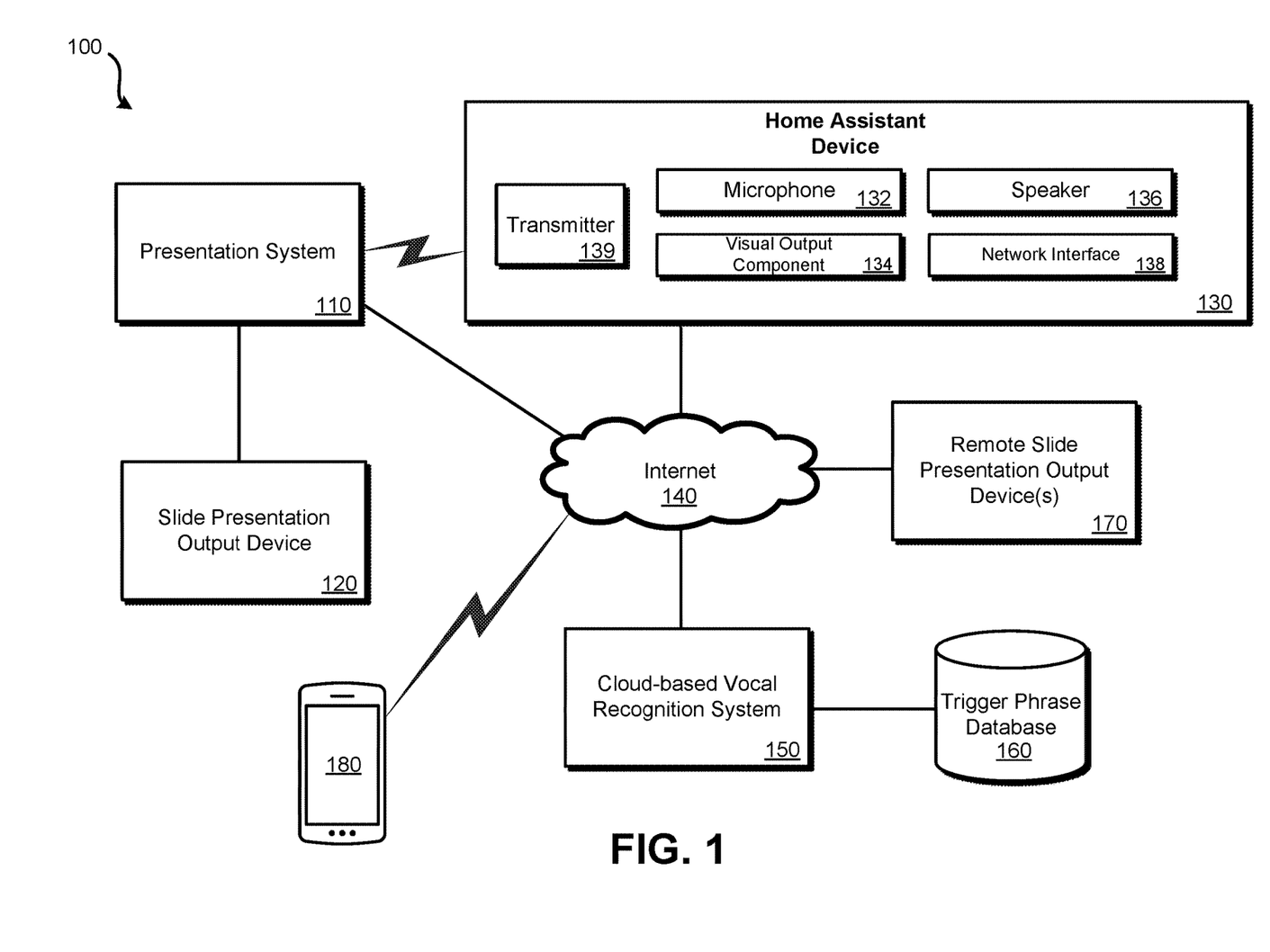
FIG. 1 illustrates a block diagram of an embodiment of a presentation vocal trigger system.

Additional detail regarding these and additional embodiments are provided in relation to the figures. FIG. 1 illustrates a block diagram of an embodiment of a presentation vocal trigger system 100. Presentation vocal trigger system 100 may include: presentation system 110; slide presentation output device 120; home assistant device 130; internet 140; cloud-based vocal recognition system 150; trigger phrase database 160; remote slide presentation output device(s) 170; and remote computerized device 180. Presentation system 110 can represent a computerized system that outputs a slide presentation for presentation by slide presentation output device 120. Presentation system 110 may be a computer system that executes software that allows a user to create a set of one or more slides (the "slide deck") and output a visual presentation that involves moving sequentially through the slide deck. Presentation system 110 may include or be connected with a slide presentation output device that allows a slide presentation to be output. Slide presentation output device 120 may be a monitor or projector. For presentations that are given in-person by the presenter, slide presentation output device 120 may typically present the presentation in a large enough format to be seen by all of the people in the audience. In some embodiments, a presentation may be given virtually, rather than in person. In such embodiments, rather than a single slide presentation output device 120 being present, presentation system 110 may output the presentation to one or more remote slide presentation output devices 170 via Internet 140 (or via another network, such as an intranet) for presentation. Remote slide presentation output devices 170 may be computer systems operated by viewers of the presentation output by presentation system 110. For example, video conferencing software or a cloud-based video conferencing system may be used to output video and audio from presentation system 110 to one or more remote slide presentation output devices 170.

Home assistant device 130 may be a device capable of capturing audio from its ambient environment, determining if a user is attempting to interact with home assistant device 130, analyze the speech (either locally or using a cloud-based server system), and have an action performed in response to the speech. Speech input provided by a user to home assistant device 130 may serve as the primary form of user input to home assistant device 130. Home assistant device 130 may include: microphone 132; visual output component 134; speaker 136; and network interface 138. Home assistant device 130, in some embodiments, may be an Amazon Echo® or Google Home®. Microphone 132 may be used to continually listen to an ambient environment of home assistant device 130 for one or more particular "wake-up" trigger words or phrases. Until such a wake-up word or phrase is heard, home assistant device 130 may not perform any additional processing in response to received audio and received audio may be ignored or discarded. When a wake-up word or phrase is detected, home assistant device 130 may attempt to analyze spoken words received after the wake-up word or phrase. Such processing may performed locally or remotely. In some embodiments, a spoken word or phrase captured after the wake-up trigger words or phrase is transmitted via network interface 138 to cloud-based vocal recognition system 150 via Internet 140. Network interface 138 may allow home assistant device 130 to communicate with a wired or wireless local area network (LAN) that is connected with the Internet 140.

Speech captured by microphone 132 that has been determined to follow a wake-up trigger word or phrase may be transmitted to cloud-based vocal recognition system 150. While such speech is being analyzed, visual output component 134 may be illuminated to indicate that home assistant device 130 has been successfully woken-up and that received speech is in the process of being analyzed. Cloud-based vocal recognition system 150 may receive the captured speech following the wake-up word or phrase and may perform natural language processing to determine what question or command the person intended. For instance, if the person asked "Hello assistant—what time is it?" "Hello assistant" may be the wake-up phrase and "what time is it?" is the question that cloud-based vocal recognition system 150 is attempting to analyze and interpret.

Cloud-based vocal recognition system 150, based on the determined command or question, may transmit a response to home assistant device 130 for output via speaker 136 and/or may transmit a command to another system or device, such as presentation system 110. In some embodiments, a response is transmitted by cloud-based vocal recognition system 150 to home assistant device 130, which, in turn, transmits a response to presentation system 110.

In a situation where home assistant device 130 is to be used for presentation, a presenter may first issue a command to home assistant device 130 that indicates that a presentation mode is to be entered. In the presentation mode, speech may be continuously captured and analyzed using home assistant device 130 and cloud-based vocal recognition system 150 (regardless of a wake-up phrase or word being spoken). For instance, a user may state: "Hello assistant, please start presentation mode." This initial wake-up command may cause the home assistant device 130 to be placed into a continuously listening mode that is streaming captured speech to cloud-based vocal recognition system 150 for analysis.

Based on received speech while in the presentation mode, cloud-based vocal recognition system 150 may determine when a slide transition is to occur by analyzing the received speech for words or phrases included in trigger phrase database 160. Trigger phrase database 160 may be stored locally by cloud-based vocal recognition system 150 or may be otherwise accessible by cloud-based vocal recognition system 150. Trigger phrase database 160 may include one or more trigger words or phrases that have been defined by a user to trigger a transition or animation in a slide presentation being output by presentation system 110. Further detail regarding trigger phrase database 160 is provided in relation to FIG. 3. When cloud-based vocal recognition system 150 determines that a trigger word or phrase within trigger phrase database 160 has been detected, a slide transition request indicating the appropriate slide to which the presentation should be transitioned is transmitted to presentation system 110. The slide transition request may be relative or absolute. For example, an absolute request may be a transition to a specific slide (e.g., slide 3). A relative request may be dependent on the slide currently being presented, (e.g., the next slide, or the previous slide).

In some embodiments, the cloud-based vocal recognition system may transmit the slide transition request to home assistant device 130. In response, the home assistant device 130 may transmit the slide transition request to presentation system 110, either via a network (e.g., LAN, the Internet) or directly, such as via an infrared, radio, or Bluetooth transmitter 139. From the point of view of presentation system 110, transmitter 139 may appear to be a "dumb" handheld wireless presenter remote control (that would typically receive input directly from the presenter via one or more buttons). In some embodiments, transmitter 139 is part of a separate device that is connected, either wirelessly or via a wire, to home assistant device 130.

Remote computerized device 180, which may be a smartphone, laptop, tablet computer, or some other computerized device capable of communicating with the Internet, either via a native application or a web browser, may be used to present a user interface to allow a user to define trigger phrases that are to be stored to trigger phase database 160. In some embodiments, such an interface may be provided via presentation system 110. A presenter or user may use computerized device 180 to provide input that is used to populate trigger phrase database 160, such as in FIG. 3.

Figure 2:
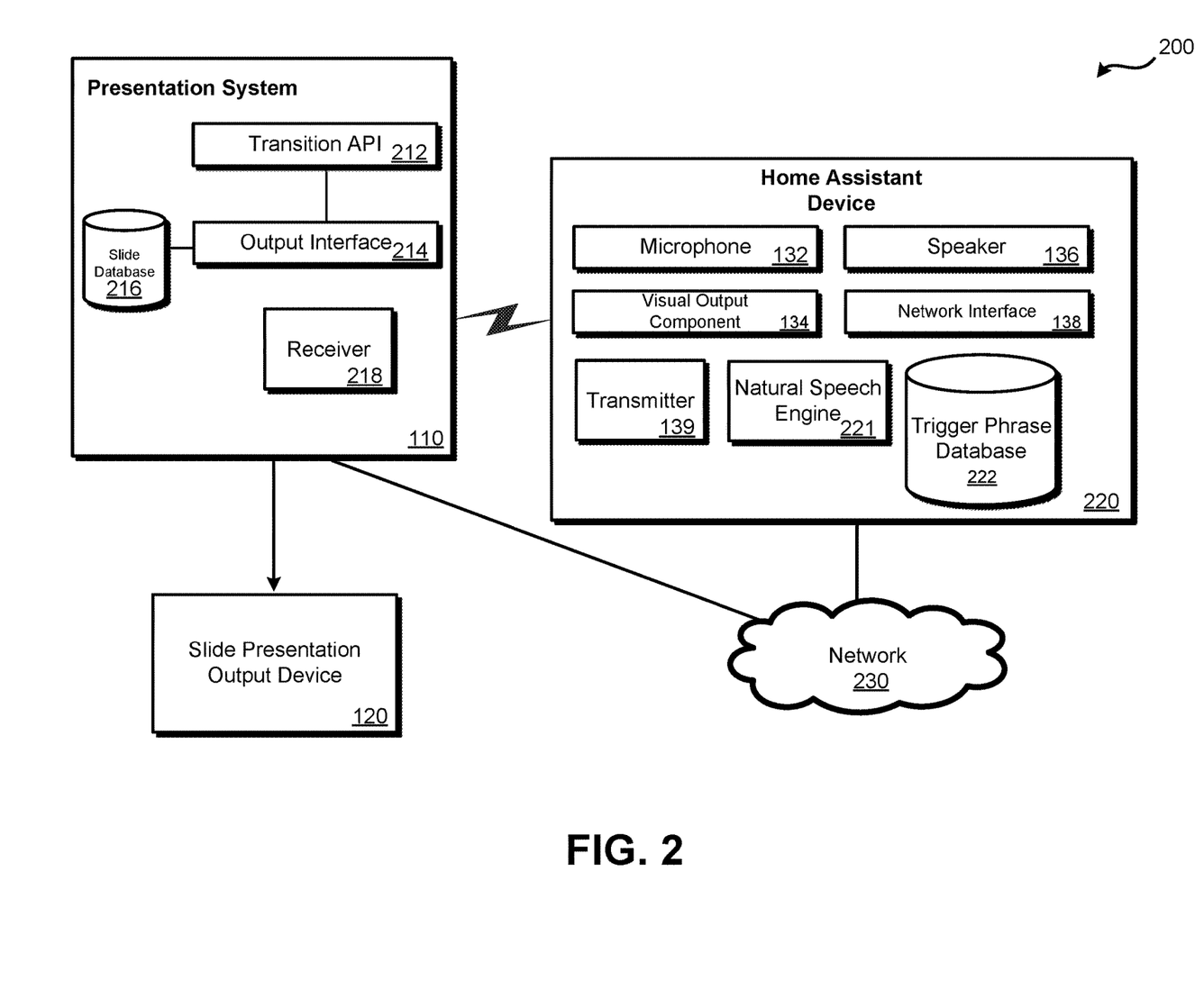
FIG. 2 illustrates a block diagram of another embodiment of a presentation vocal trigger system.

FIG. 2 illustrates a block diagram of an embodiment of a presentation vocal trigger system 200. In system 200, rather than a cloud-based vocal recognition system 150 being used, natural speech engine 221 may be incorporated as part of home assistant device 220. Therefore, captured speech is not transmitted to the cloud in system 200, but rather is analyzed locally. Home assistant device 220 may also store trigger phrase database 222 locally. Trigger phrase database 222 may function similarly to trigger phrase database 160 of FIG. 1 and as detailed in relation to FIG. 3. Home assistant device 220 may use network 230 to communicate with presentation system 110 or may perform communication using a dedicated IR, radio, or Bluetooth transmitter 139. Network 230 may represent a LAN and/or the Internet.

In system 200, additional detail regarding presentation system 110 is illustrated. It should be understood that such components may be part of system 100 of FIG. 1. Presentation system may include transition API 212; output interface 214; slide database 216; and receiver 218. Receiver 218 may receive wireless or wired communications from transmitter 139 and may instruct transition API 212 to perform a slide transition based on the data received via the transmission. Transition API 212 may be a software interface that allows external devices and software to interact with the software being used by presentation system 110 to output the presentation. For example, Microsoft PowerPoint® may allow for other components and software to provide input to transition API 212 to cause slide transitions. Output interface 214 may output a slide from slide database 216 to slide presentation output device 120 for presentation. Output interface 214 may also output an animation on a particular slide or as a transition between particular slides. Slide database 216 may store one or more slide decks. At a given time, a single slide deck from slide database 216 may be loaded for presentation and output to slide presentation output device 120 by output interface 214.

While FIGS. 1 and 2 illustrate a home assistant device as performing the tasks of receiving audio and, in some embodiments, outputting a signal to the presentation signal to cause a slide transition, it should be understood that, more generally, an audio-based trigger system may be used in place of the home assistant devices. An audio-based trigger system may be a home assistant device or may be a device that is dedicated to controlling a presentation based on detected trigger words or phrases. For instance, an audio-based trigger system may be acquired exclusively for use in controlling various presentation systems. In some embodiments, an audio-based trigger system may be an application that is executed by a computerized device. For example, an application may be executed by a smartphone or tablet computer that allows the computerized device to perform the functions of home assistant device 130 or 220. In still other embodiments, the functionally of home assistant devices 130 and 220 may be incorporated as part of the same system functioning as presentation system 110. For example, a software package may be installed on presentation system 110 that causes presentation system 110 to execute natural speech engine 221 or transmit captured speech to a cloud-based vocal recognition system for processing.

Figure 3:
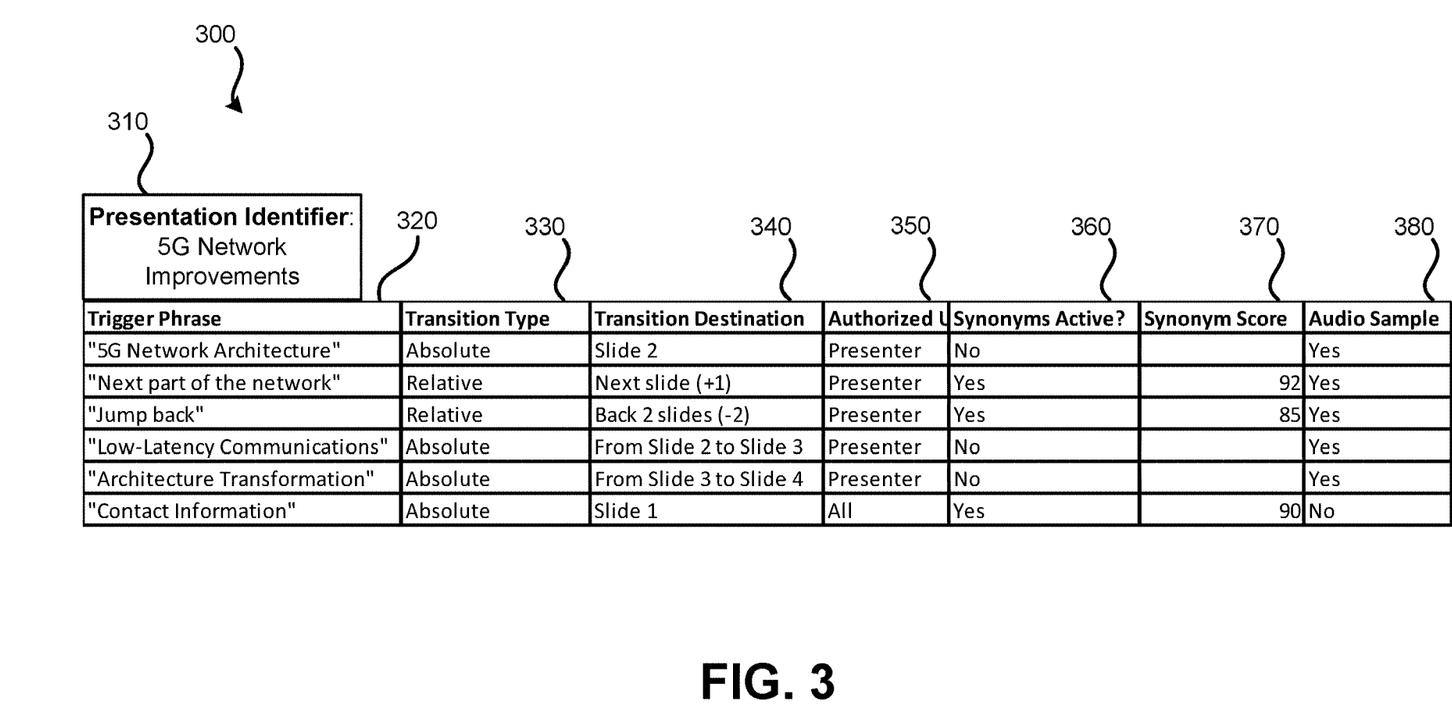
FIG. 3 illustrates an embodiment of a database that is used to link trigger word and trigger phrases to slide transitions.

Prior to any of the embodiments of FIGS. 1 and 2 being used to vocally trigger a transition between slides of a slide deck, the presenter may be required to assign trigger words and/or phrases and associate these trigger words and/or phrases with: 1) a specific slide deck; and/or 2) specific slides. Herein, for simplicity, "trigger phrases" is intended to refer to one or more words that serves as the trigger for a slide transition. FIG. 3 illustrates an embodiment of trigger phrase entries 300 that may be stored in a trigger phrase database and that is used to link trigger word and trigger phrases to slide transitions. A web-based interface hosted by cloud-based vocal recognition system 150 may be accessed from various forms of computerized devices that can execute a web browser. In other embodiments, a native application that allows for the creation of trigger phrase entries 300 may be executed and presented to the presenter (or his agent) via a computerized device, such as a laptop computer, smartphone, or tablet computer. The presenter (or his agent) may be provided with an interface that allows for the following items to be specified: presentation identifier field 310; trigger phrase fields 320; transition type fields 330; transition destination fields 340; authorized user fields 350; synonym detection fields 360; synonym score fields 370; and audio sample 380. In still other embodiments, a home assistant may be used to progress through voice-based prompts that allow a user to specify data for some or all of presentation identifier field 310; trigger phrase fields 320; transition type fields 330; transition destination fields 340; authorized user fields 350; synonym detection fields 360; synonym score fields 370; and audio samples 380.

When trigger phrase entry fields 300 are created by a presenter, the presenter may be required to provide a presentation identifier for presentation identifier field 310 that is linked with at least a subset of the database's stored entries. When the presenter desires to initiate control of a presentation using trigger phrase entries 300, the presenter may need to specify the presentation identifier. The presenter may have multiple defined trigger phrase entries in a trigger phrase database for different presentations or, even for the same presentation. For example, using a home assistant, the presenter may state "Hello Assistant—Start voice control of the '5G Network Improvements" presentation." Such a command may trigger the home assistant and or cloud-based vocal recognition system to access the correct entries from the trigger phrase database.

As illustrated in FIG. 3, six trigger phrases are linked with presentation identifier field 310. Each trigger phrase of trigger phase fields 320 may be specified by the presenter as a word or phrase that causes a slide transition or an animation to occur as part of a slide presentation. Maps to each trigger phrase may be a transition type, indicated by transition type fields 330. Transition type fields 330 may be absolute or relative. An absolute transition may be a transition to a particular slide. For example, the trigger phrase "5G Network Architecture" may always be linked with slide 2. Therefore, regardless of the slide currently being presented, if the presenter says "5G network architecture" while the home assistant is monitoring for trigger phrases, the presentation system may be triggered to transition to slide two. In contrast, a relative transition type refers to a slide transition that is based on a current slide being presented. For example, if the presenter says "Next part of the network," a transition to the next slide may be performed (e.g., from slide 3 to 4 or 4 to 5). In some embodiments, by virtue of the presenter selecting a transition destination, the transition type may automatically be determined.

An additional type of absolute transition may require that a transition originate from a particular slide to a particular slide. For example, if "Low-Latency Communications" is spoken while slide 2 is being output for presentation, a transition to slide 3 may be triggered to occur. However, if any other slide is being presented, no action may be performed if "Low-Latency Communications" is spoken since the transition is conditioned on slide 2 being presented. Such an arrangement may help accidental transitions by limiting the number of active trigger phrases at a given time.

In some embodiments, for each trigger phrase, an authorized user may be specified in authorized user fields 350. Certain trigger phrases may be permitted to be spoken by persons other than the presenter. For example, if someone in the audience says "contact information," it may be desirable for the presentation to transition to a contact information slide, which, in this example, is slide one. In most situations, however, it may be desirable to have most trigger phrases only trigger when spoken by the presenter. A determination of who is speaking may be performed in multiple ways. In some embodiments, a volume threshold is used. If the trigger phrases spoken at a volume above the volume threshold, it may be assumed that the presenter spoke the trigger phrase. If the trigger phrase is spoken at a volume below the volume threshold, it may be assumed that a person in the audience spoke the trigger phrase. Such an arrangement may be based on the assumption that the center is wearing or holding a microphone or is otherwise closer to the microphone of the home assistant or other form of audio-based trigger system. In other embodiments, the home assistant or other form of audio-based trigger system may be trained to recognize the voice of the presenter. In some embodiments, the presenter may be requested to perform a training process such that vocal characteristics of the presenter may be used to distinguish the presenter's voice from other persons' voices.

In some embodiments, the presenter can specify whether synonyms are to be active via synonyms detection fields 360. If active, a word or phrase spoken by an authorized user that is similar to the trigger phrase may have the same effect as if the trigger phrase was spoken. For example rather than the presenter stating "next part of the network", if the presenter said "next piece of the network", a decision may be made as to whether the spoken synonymous phrase is similar enough to the trigger phrase. The determination as to whether it is similar enough may be based on synonym score fields 370. Synonym score fields 370 may be selected by the presenter or user creating trigger phrase entries 300. The higher the score, the more similar the spoken phrase would need to be to the trigger phrase in order for the slide transition to be performed. The score may take into account the similarity of the meanings of words, number of words, spelling of words, number of words that match the trigger phrase, and/or proximity of words. In some situations, the presenter or user creating trigger phrase entries 300 may determine that only the exact trigger phrase should be spoken in order to trigger the slide transition. For example, in the illustrated embodiment, "5G Network Architecture" is required to be spoken exactly in order to trigger the absolute slide transition to slide 2.

In some embodiments, as part of trigger phrase entries 300 or stored in a separate location but linked with trigger phrase entries 300, an audio sample of one or more of the trigger phrases 320 may be stored. The presenter may be requested or required to speak the linked trigger phrase one or more times to allow the natural speech engine to learn how to recognize the trigger phrase. Such an arrangement may be more accurate than relying on the natural speech engine to recognize the phrase without training on the specific trigger phrase.

Figure 4:
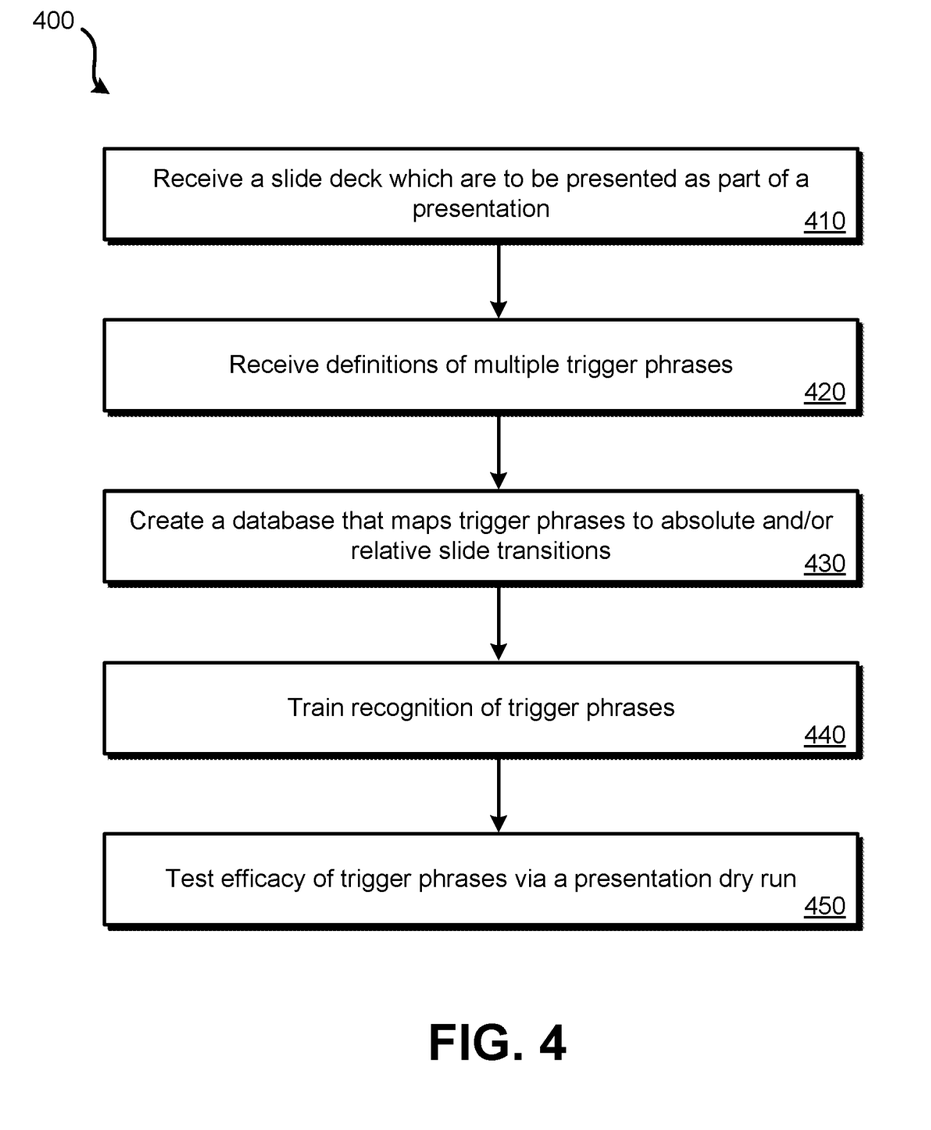
FIG. 4 illustrates an embodiment of a method for establishing audio-based triggers for a slide-based presentation.

Various methods may be performed using the systems, devices, and database arrangements of FIGS. 1-3. FIG. 4 illustrates an embodiment of a method 400 for establishing audio-based triggers for a slide-based presentation. Method 400 may be performed using system 100 or system 200 of FIGS. 1 and 2, respectively. At block 410, a slide deck may be received by a presentation system. This may involve a user creating a slide deck or loading a slide deck onto the presentation system, such as retrieving the slide deck from the internet or using a non-transitory processor-readable medium to load the slide deck onto a non-transitory processor-readable medium of the presentation system. In some embodiments, block 410 may involve the slide deck (or characteristics of the slide deck) being provided or loaded onto a home assistant device or cloud-based vocal recognition system. These characteristics may be used to determine: the name of the presentation; the number of slides; the names of slides; etc.

At block 420, a presenter or some other user, may provide definitions of multiple trigger phrases for storage to a trigger phrase database, such as trigger phrase database 160 or 222. The definitions may be provided via a computerized device (e.g., mobile device, tablet computer, smartphone, laptop computer, desktop computer) that executes a web browser that allows the presenter or user to access a website or a native application where the presenter or user can link entries, such as those presented in FIG. 3, with the slide deck of block 410. In some embodiments, the trigger phrases may be received via a home assistant device in the form of voice input. For example, the home assistant device may step through a series of voice based prompts, such as those illustrated in Table 1, in the numbered order.

TABLE 1

| Home Assistant Device Output Speech | User Speech |
|---|---|
| — | (1) "Hello Home Assistant - Please define presentation trigger phrases." |
| (2) OK - What is the name of the presentation? | (3) "5G Network Improvements" |
| (4) What is the first slide transition you would like to define? | (5) "An absolute transition to slide 2." |
| (6) What is the trigger phrase? | (7) "5G Network Architecture" |
| (8) What is the next slide transition youwould like to define? | (9) "A relative transition to the next slide" |
| (10) What is the trigger phrase? | (11) "Next part of the network" |

Table 1 illustrates an example of how voice-based communication between the home assistant device and a user may occur for a user to define trigger phrases directly through the home assistant device via speech-based interaction. By performing such a setup of trigger phrases, the natural speech engine may receive an audio sample of the presenter speaking the trigger phrase, which can be used to later recognize the trigger phrase. It should be understood that the "conversation" of Table 1 may continue depending on the number of trigger phrases to be defined. Further, the questions asked by the home assistant device may be expanded to obtain data about other fields indicated in trigger phrase entries 300 of FIG. 3.

In block 430, a database (and/or database entries) may be created that links the trigger phrases received at block 420 with absolute and/or relative slide transitions. Such a database or database entries may resemble the example entries of FIG. 3. The created database entries may be mapped to an indication of the particular presentation with which they are associated. In some embodiments, the defined trigger phrases may be presentation-agnostic and may be reused by the presenter for various different presentations and slide decks.

At block 440, training of the trigger phrases may be performed. If the user initially defined the trigger phrases by vocally stating the trigger phrases, such as directly to the home assistant device, block 440 may not be necessary. However, if the trigger phrases were input by another means (e.g., typed into a native application or web-based interface), having the presenter speak each trigger phrase one or more times and analyzing how the user states the trigger phrase may help increase the reliability of detecting the transition while the presentation is being given.

Figure 5:
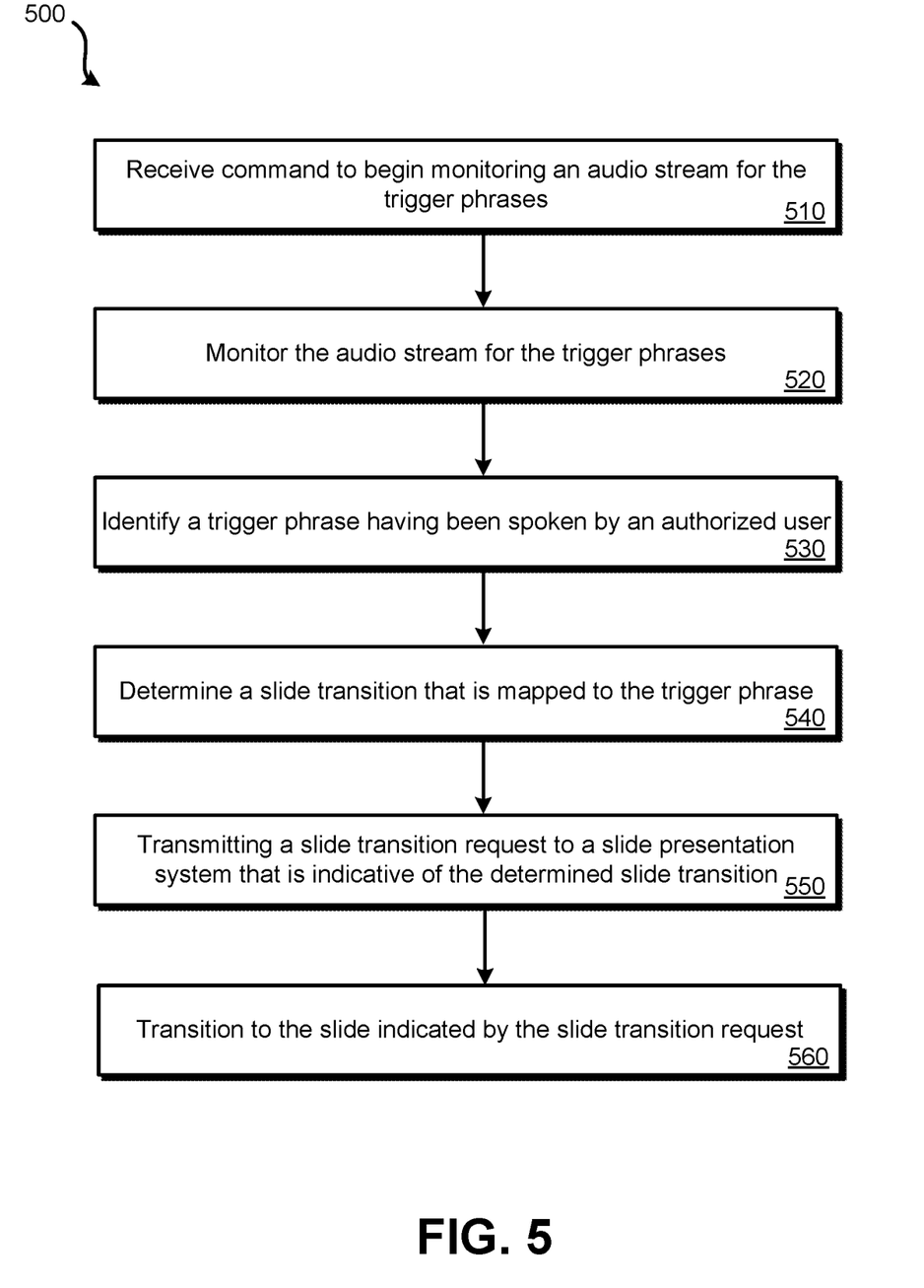
FIG. 5 illustrates an embodiment of a method for triggering transitions within a slide-based presentation using a presentation vocal trigger system.

At block 450, one or more dry runs of the presentation may be given. A dry run may be may be similar to when the final presentation is given, but without an audience. Therefore, block 450 may be performed according to method 500. Method 500 may then be performed again for the final presentation given to an audience. While performing block 450, the presenter may notice that certain trigger phrases do not function as intended. Functionality may not be as intended for multiple reasons, such as: the phrase not being detected as spoken by the presenter; the presenter accidentally saying the phrase and triggering the transition unintentionally, or the trigger phrase not fitting naturally into the flow of the presentation. If one or more of such problems are realized by the presenter during the dry run, the presenter or a user may modify the trigger phrases or the characteristics of the trigger phrases (e.g., when a particular trigger phrase is active).

FIG. 5 illustrates an embodiment of a method 500 for triggering transitions within a slide-based presentation using a presentation vocal trigger system. Method 500 may be performed using system 100 or system 200 of FIGS. 1 and 2, respectively. Method 500 may be performed after method 400 has been performed. At block 510, a command (which may be a voice-based command) may be received by a home assistant device, or, more generally, an audio-based trigger system, to initiate monitoring of an audio stream for a set of trigger phrases. The audio stream may be captured using one or more microphones of the home assistant device or the audio-based trigger system (or through some separate audio capture device). The command may indicate the particular presentation that is to be presented. In some embodiments, it may not matter which presentation is to be presented if only a single set of trigger words have been defined and are to be used regardless of the presentation being given. As part of block 510 or prior to block 510, the presenter or another user may have started the presentation on a presentation system such that the presentation is output to a slide presentation output device or to one or more remote slide presentation output devices.

The command received at block 510 may be in the form of a spoken command. For instance, for a home assistant device, a presenter may state a wake-up phrase followed by the command, such as "Hello assistant, initiate presentation control." The home assistant device may acknowledge the command and may illuminate one or more lights to indicate that it is actively monitoring for the trigger phrases and/or output synthesized speech indicating that an audio stream is now being monitored for the trigger phrases.

At block 520, the home assistant device or, more generally, the audio-based trigger system may monitor the captured audio stream for the trigger phrases. This monitoring may be performed by analyzing captured speech using a cloud-based vocal recognition system as in system 100 or a local natural speech engine as in system 200. At block 530, as part of the audio stream, a trigger phrase that previously defined may be identified. If the presenter has activated the feature, a synonym of the trigger phrase having a score above a defined threshold may be identified at block 530 instead of the exact trigger phrase.

At block 540, in response to detecting the trigger phrase, a slide transition that is to occur may be determined. This slide transition may be absolute (to a particular slide) or relative (e.g., to a next or a previous slide). The slide transition may be determined by accessing a database entry, such as one of the database entries illustrated in FIG. 3, and accessing an indication of the slide transition mapped to a trigger phrase.

At block 550, a slide transition request based on the determination block 540 may be transmitted to the slide presentation system. The slide transition request may be transmitted to software that is outputting the presentation via an API of the presentation software. The slide transition request may indicate: the slide to which the transition should occur; a next slide command; a previous slide command; and/or one or more conditions that are required to be true for the slide transition to be performed. For example, a slide transition request may indicate that the slide transition should only be performed if the currently presented slide is slide 2.

At block 560, in response to block 550, the slide transition may be performed by the slide presentation system and/or the software being executed that is outputting the slide deck for presentation. If one or more of the conditions of block 550 is determined to be false, block 560 may not be performed. For example, referring to the previous example, if it is determined that the currently presented slide is not slide 2, block 560 may not be performed in response to the identified trigger phrase.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system that triggers transitions within a slide presentation, the system comprising:
 a home assistant device in communication with a cloud-based server system, comprising:

a microphone that serves as a primary user input interface;
a speaker;
a wireless network interface through which the home assistant device communicates with the cloud-based server system; and
one or more processors in communication with the microphone, the speaker, and the wireless network interface, wherein the one or more processors are configured to:
receive a plurality of slide transition definitions from a user, wherein:
a first subset of the plurality of slide transition definitions that defines one or more relative slide transitions; and
a second subset of the plurality of slide transition definitions that defines an absolute slide transition to a specific slide:
receive a plurality of trigger words from the user, wherein:
each trigger word of the plurality of trigger words is linked to a slide transition definition of the plurality of slide transition definitions; and
each slide transition definition of the plurality of slide transition definitions defines a selection of a slide of the plurality of slides for presentation;
create a database that maps the plurality of trigger words to the plurality of slide transition definitions;
receive a voice request, via the microphone, to initiate audio-based control of the slide presentation being output by a presentation system;
monitor an audio stream received via the microphone for the plurality of trigger words;
identify a trigger word of the plurality of trigger words within the monitored audio stream;
determine, based on accessing the database, a slide transition to be performed based on the trigger word; and
transmit, to the presentation system, a slide transition request that indicates a slide to be presented based on the determined slide transition.

2. The system that triggers transitions within the slide-based presentation of claim 1, the system further comprising:
the presentation system, comprising:
a display system for presenting slides; and
one or more processors, wherein the one or more processors are configured to:
receive the slide transition request; and
cause the presentation to transition to the slide of the plurality of slides based on the received slide transition.

3. The system that triggers transitions within the slide-based presentation of claim 1, wherein the one or more processors of the home assistant device being configured to monitor the audio stream for the plurality of trigger words comprises the one or more processors being configured to:
transmit the audio stream to the cloud-based server system via the Internet; and
perform a voice recognition process on the received audio stream.

4. The system that triggers transitions within the slide-based presentation of claim 1, wherein the one or more processors of the presentation system are further configured to define the plurality of trigger words based on content of the plurality of slides.

5. The system that triggers transitions within the slide-based presentation of claim 1, wherein the home assistant device in communication with the cloud-based server system is configured to:
perform a training process to distinguish a voice of a presenter from voices of an audience, wherein the home assistant device in communication with the cloud-based server system that is configured to monitor the audio stream for the plurality of trigger words comprises monitoring only the voice of the presenter in the audio stream for the plurality of trigger words.

6. A method for triggering transitions within a slide presentation, the method comprising:
receiving, by an audio-based trigger system, a plurality of slide transition definitions from a user, wherein:
a first subset of the plurality of slide transition definitions that defines one or more relative slide transitions; and
a second subset of the plurality of slide transition definitions that defines an absolute slide transition to a specific slide:
receiving, by the audio-based trigger system, a plurality of trigger words from the user, wherein:
each trigger word of the plurality of trigger words is linked to a slide transition definition of a plurality of slide transition definitions; and
each slide transition definition of the plurality of slide transition definitions defines a selection of a slide of the plurality of slides for presentation;
creating, by the audio-based trigger system, a database that maps the plurality of trigger words to the plurality of slide transition definitions;
receiving, by the audio-based trigger system, a voice request to initiate audio-based control of the slide presentation being output by a presentation system;
monitoring, by the audio-based trigger system, an audio stream for the plurality of trigger words;
identifying, by the audio-based trigger system, a trigger word of the plurality of trigger words within the monitored audio stream;
determining, based on accessing the database by the audio-based trigger system, a slide transition definition to be performed based on the trigger word;
transmitting, by the audio-based trigger system, to the presentation system, a slide transition request that indicates the slide based on the determined slide transition definition; and
transitioning, by the presentation system, to a slide to be presented of the plurality of slides based on the received slide transition request.

7. The method for triggering transitions within the slide-based presentation of claim 6, wherein the audio-based trigger system comprises a separate audio-listening device from the presentation system.

8. The method for triggering transitions within the slide-based presentation of claim 7, wherein the audio-based trigger system is a home assistant device that comprises: a speaker; a microphone; and a wireless network interface.

9. The method for triggering transitions within the slide-based presentation of claim 8, wherein the audio-based trigger system further comprises a cloud-based server system that communicates with the home assistant device via the Internet.

10. The method for triggering transitions within the slide-based presentation of claim 9, wherein monitoring, by the audio-based trigger system, the audio stream for the plurality of trigger words comprises:

transmitting, by the audio-based trigger system, the audio stream to the cloud-based server system via the Internet; and performing, by the cloud-based server system, a voice recognition process on the received audio stream.

11. The method for triggering transitions within the slide-based presentation of claim 6, wherein the presentation system defines the plurality of trigger words based on content of the plurality of slides.

12. The method for triggering transitions within the slide-based presentation of claim 6, wherein the audio-based trigger system is incorporated as part of the presentation system.

13. The method for triggering transitions within the slide-based presentation of claim 6, further comprising:
performing, by the audio-based trigger system, a training process to distinguish a voice of a presenter from voices of an audience, wherein monitoring, by the audio-based trigger system, the audio stream for the plurality of trigger words comprises monitoring only the voice of the presenter in the audio stream for the plurality of trigger words.

14. A non-transitory processor-readable medium comprising processor-readable instructions configured to cause one or more processors to:
receive a plurality of slide transition definitions from a user, wherein:
a first subset of the plurality of slide transition definitions that defines one or more relative slide transitions; and
a second subset of the plurality of slide transition definitions that defines an absolute slide transition to a specific slide:
receive a plurality of trigger words from the user, wherein:
each trigger word of the plurality of trigger words is linked to a slide transition definition of the plurality of slide transition definitions; and
each slide transition definition of the plurality of slide transition definitions defines a selection of a slide of the plurality of slides for presentation;
create a database that maps the plurality of trigger words to the plurality of slide transition definitions;
receive a voice request to initiate audio-based control of a slide presentation being output by a presentation system;
monitor an audio stream for the plurality of trigger words;
identify a trigger word of the plurality of trigger words within the monitored audio stream;
determine, based on accessing the database, a slide transition definition to be performed based on the trigger word; and
transmit to the presentation system, a slide transition request that indicates a slide to be presented based on the determined slide transition definition.

15. The non-transitory processor-readable medium of claim 14, wherein the processor-readable instructions are executed using a system comprising a home assistant device and a cloud-based server system that communicates with the home assistant device.

16. The non-transitory processor-readable medium of claim 15, wherein the processor-readable instructions are further configured to cause the one or more processors to:
cause the audio stream to be transmitted to the cloud-based server system via the Internet; and
perform a voice recognition process on the received audio stream using the cloud-based server system.

17. The non-transitory processor-readable medium of claim 16, wherein the processor-readable instructions are further configured to cause the one or more processors to:
receive the plurality of slide transition definitions wherein: a first subset of the plurality of slide transition definitions defines slide transitions to a next consecutive slide; and a second subset of the plurality of slide transition definitions defines slide transitions to a specific slide.

* * * * *